United States Patent [19]

MacFarlane et al.

[11] Patent Number: 5,212,622

[45] Date of Patent: May 18, 1993

[54] LARGE SURFACE AREA ELECTRODES

[75] Inventors: Douglas R. MacFarlane, Elsternwick; John R. Tetaz, Templestowe; Maria Forsyth, Blackburn, all of Australia

[73] Assignee: Specialized Conductives Pty. Ltd., Neerim, Australia

[21] Appl. No.: 784,262

[22] Filed: Oct. 29, 1991

Related U.S. Application Data

[63] Continuation-in-part of Ser. No. 431,600, Nov. 3, 1989, Pat. No. 5,146,391.

[30] Foreign Application Priority Data

Aug. 3, 1991 [AU] Australia .................. PJ9014

[51] Int. Cl.$^5$ .................. H01G 1/01; H01G 9/00
[52] U.S. Cl. .................. 361/305; 361/502
[58] Field of Search .................. 361/303–305, 361/502

[56] References Cited

U.S. PATENT DOCUMENTS

| 3,926,916 | 12/1975 | Mastrangelo | 252/63.5 |
| 4,023,079 | 5/1977 | Selover et al. | 361/502 |
| 4,687,598 | 8/1987 | Varma | 252/518 |
| 4,977,357 | 12/1990 | Shrier | 338/21 |

Primary Examiner—Donald A. Griffin
Attorney, Agent, or Firm—Gottlieb, Rackman & Reisman

[57] ABSTRACT

A high surface area electrode formed from filler particles having a high surface to volume ratio in a binder able to support the conduction of ions. The binder may be a hydrophilic polymer and hydrogel able to swell to incorporate a solvent and its dissolved ionic material while retaining its mechanical strength. The swelling may be regulated by control of the degree of cross-linking of the binder material.

35 Claims, No Drawings

LARGE SURFACE AREA ELECTRODES

This application is a continuation-in-part of U.S. Ser. No. 431,600, filed Nov. 3, 1989 now U.S. Pat. No. 5,146,391, issued Sep. 8, 1992.

BACKGROUND OF THE INVENTION

The present invention relates to high surface area electrodes, and to a process for the preparation of electrodes having high surface area.

Prior art electrodes include those fabricated from metal plates, roughened and etched metal plates and conductive filler particles compounded in an insulative binder. These prior art electrodes are limited in surface area and therefore provide a significant energy loss on passage of current. Further, in many applications such as the delivery of energy into a liquid medium, gas generation is undesirable. Such applications include the electrodes used in some hot water heating systems and further, those used in heart pacemaker and defibrillator systems and those used in membrane bio-sensors. The high surface area electrodes of the present invention substantially reduces such gas generation.

U.S. Pat. No. 4,687,598 (Varma) describes the preparation of an electrode-active material for batteries wherein the material consists of an electrochemical material in contact with a ligand and a binder. This electrode-active material is not capable of providing a high surface area electrode having high capacitance, low polarization, low energy loss and low gas generation on the passage of current through the electrode.

U.S. Pat. No. 4,551,267 describes the preparation of a plastic electrical conductor for battery electrode applications. However, because this conductor utilizes a plastic binder material which has only a very low ionic conductivity, this conductor cannot serve as a high surface area electrode. Only a small part of the surface area of its carbon or graphite particles, namely those resident at or near the surface of the electrode will operate as part of the electrochemical interface.

French Patent 2,442,514 disclose a composite electrode material consisting of a mass of electrically conductive material dispersed within a mass of a solid solution of an ionic material dissolved in a plastic macro molecular material. This composite electrode material is restricted in use because of the need to provide a dissolved ionic compound. Such a dissolved ionic compound would leach out at an electrode made from such a material if placed in an aqueous solution. This would occur, for example, in hot water heating and pacemaker electrode application of these electrodes.

In order to avoid the loss of the ionic material in such applications, it is necessary to provide ionic groups bound to the polymeric backbone as described in the present invention. The materials described in French Patent 2,442,514 would also tend to swell and disintegrate in an aqueous media. The present invention provides materials which have a controlled degree of swelling and therefore remain intact during use in aqueous media.

A further advantage of the electrodes described herein in applications requiring delivery of energy into the ion containing medium is the avoidance of electrochemical reactions at the interface. For example, where the ion containing medium is a water based solution, operation of prior art electrodes commonly produces hydrogen at the cathode and oxygen at the anode. Such gas production is generally undesirable. The electrodes of the invention avoid such gas generation by virtue of their high surface area and therefore their lower over potential during operation at a given current.

A still further advantage of the electrodes described herein is their ability to be molded into any desired shape.

BRIEF DESCRIPTION OF THE PRESENT INVENTION

According to one embodiment of this invention there is provided a high surface area electrode comprising a composite of an electronically conductive particulate filler dispersed in a binder material, wherein the particles are substantially in intimate contact, and the binder material is able to support conduction of ions to and from a substantial proportion of the surface of the filler particles. Preferably, the electrode additionally comprises an external connection.

The binder material may additionally comprise a polymeric material having ionized groups and corresponding counterions.

According to another embodiment of this invention there is provided a process for the preparation of a high surface area electrode. The process comprises preparing a composite of an electronically conductive particulate filler dispersed in a binder material such that the filler particles are substantially in intimate contact.

DETAILED DESCRIPTION OF A PREFERRED EMBODIMENT

The electrode of the present invention has high surface area by virtue of the high surface to volume ratio of the filler particles. The binder material should be able to support conduction of ions within the volume of the composite material to a substantial part of the surface of the filler particles. The surface area available for electrode action includes a substantial part of the surface area of the filler particles contained within the composite material.

In order to operate as an electrode in an electrochemical situation, i.e., any situation which requires the conversion of electronic current in the external circuit to ionic current at the electrode surface, the composite material should be formulated in a fashion such that the conductive filler particles are at least substantially in intimate contact with one another and at some point in intimate contact with an external connection. The mass of high surface area filler material constitutes an electrically conductive extension of the external connection. As such the filler particles act as a high surface area per unit volume electrode.

The binder material in which the particulate mass of filler is dispersed should be capable of allowing conduction of ionic material to and from a large fraction of the available surface area of the particulate filler.

The overall electric impedance contributed by the conduction processes should not be so high that the electrode assembly as a whole dissipates a substantial amount of energy.

The conductive filler medium can be any highly conductive electro-conductive particulate material. Such materials which are available include a range of conductive carbon blacks (e.g. the Vulcan carbon blacks and the material known as Black Pearls 2000). Carbon is particularly favored because of the exceptionally high surface areas available, often exceeding 1000 $m^2/g$. Other conductive particulate fillers include copper, nickel, silver, platinum and a range of other metallic and metal alloy based materials.

The binder material should be able to support the easy transport of ionic materials. There are a number of ways of achieving this. If the medium into which the ion current will ultimately flow is a water or other polar solvent medium containing dissolved salts, it is sufficient that the binder material be able to swell slightly in the solvent and thereby incorporate both solvent and some of the ionic material. Such materials include hydrophilic polymers and hydrogels. The degree of swelling should be controlled to the extent that sufficient mechanical strength remains in the material to hold the mass of conductive filler particles together. This control is most easily achieved via control of the degree of cross-linking of the material.

Suitable materials include those obtained from cross-linked:

(i) cellulose and its derivatives (ii) polyethers, polyurethanes, polyacrylates, polyesters, polyimines, polyphosphasenes and other related polymeric materials having a degree of hydrophilic character such that they can absorb water and polar solvents, (iii) suitably modified siloxanes such that they have a degree of hydrophilic nature and can absorb water and polar solvents, (iv) other hydrogel forming polymer systems.

Such solution swellable materials when brought into contact with the ion containing solution will absorb an amount of the solution and its ions and hence become a conductor of ions.

Should a higher degree of ionic conductivity be required than is available from the above-mentioned materials when swollen in the solution medium of interest, then an additional concentration of ions can be build into the material via incorporation of a polymeric material having ionized groups and corresponding counterions. Such materials include those which form polyelectrolytes when neutralized, for example polyacrylic acid. The range of such materials further includes any of the following into which ionizable groups have been combined, via reaction, copolymerization or other means:

i. cellulose and its derivatives, ii. polyethers, polyurethanes, polyacrylates, polyesters, and other related polymeric material having a degree of hydrophilic character such that they can absorb water and polar solvents, iii. suitably modified siloxanes such that they have a degree of hydrophilic nature and can absorb water and polar solvents, iv. other hydrogel forming polymer systems.

Such ionizable groups include carboxylic acid groups, sulphonic acid groups, ammonium and alkyl ammonium groups, organo phosphate, organoborate and organocarbonate groups. These can be operable in either their acidic form or in their neutralized form in which case the material will incorporate a counterion. The acidity of many of these groups can be desirably increased by further incorporation of $AsF_3$, $SbF_3$, $BF_3$ or other like complexing agent.

In order to control mechanical and volumetric changes during swelling or equilibration in a solvent medium it is desirable to include in the electrode formulation an unreactive, low molecular weight liquid which can diffuse out of the electrode when it is first placed in the medium in which it is to be operated. This liquid may be water, an alcohol, an ester, aldehyde, ketone, ether or carbonate and the liquid of choice will depend on the polymer system used as the binder in the composite electrode. Typically up to 50% of this liquid may be used, with 10-20% being most useful.

Further, the binder material may comprise a solid polymer electrolyte where the solution medium to which the current ultimately flows is also a solid polymer electrolyte type of material or where the medium to which the solid polymer electrolyte based electrode interfaces has no ability to swell the solid polymer electrolyte.

The high surface area electrodes described herein have a number of applications, all of which have the requirement that the active working area of the electrode must be maximized for a given volume of electrode material. Such applications include:

i. High surface area electrodes for electrochemical cells (e.g. batteries and fuel cells) wherein some electrochemical oxidation or reduction takes place at the electrode in order to produce electric current flow in the external circuit and ionic current flow in the cell.

ii. High surface area measuring electrodes for use in conductivity, and related analytical devices. In such devices typically it is desirable that the least possible direct electrochemical reaction takes place. This situation is best achieved by employing electrodes of the highest possible surface area.

iii. High surface area electrodes for energy delivery into an ionic solution medium. In this application it is typically desired to deliver a larger amount of energy from the external circuit across the electrode interface into the ion containing medium. In such applications it is most often desirable to have an extremely low electrode interfacial impedance, in order that a minimum amount of energy is dissipated at the electrode interface. Thus the maximum amount of energy is delivered into the ion containing medium. In order to obtain a low impedance electrode it is optimum to achieve as high a surface area as possible, in order than an over potential does not build up on the electrode during operation. Where such power delivery is intended to be in the form of either very short pulses of voltage applied to the electrode or in the form of a rapidly varying alternating voltage, the lowest interfacial impedance will generally be obtained when the electrode has the highest possible surface area.

Applications of this type include the delivery of power into liquid media for rapid heating purposes for example, in hot water heating systems and also in medical applications where it is desired to deliver pulses of energy to the heart or other tissue.

iv. Low impedance electrodes for use in membrane biosensors. In these devices the frequency response of the device is governed to by the impedance of the electrode and it is highly desirable to provide a high surface area electrode which, as a result, has low impedance.

The invention is further described in the following examples, which are in no way limiting on the scope of the invention.

EXAMPLE 1

A composite material was produced by blending together 2.5 parts of Black Pearls 2000 with 7.5 parts of a liquid mixture which contains 90% by weight of methoxyoctaoxyethylene methacrylate and 10% by weight octaoxyethylene dimethacrylate. To this blend was added 2% by weight benzoyl peroxide and the material was then cast into a film 2 mm thick on a sheet of copper 2 cm×2cm. Once cured into a rubbery material a connection was then made to the edge of the copper plate and the plate immersed in a solution containing 1 mol/dm$^3$ potassium chloride and allowed to equilibrate with the solution. Measurement of the electrode impedance indicated that the material has an active surface area of the order 250 m$^2$.

EXAMPLE 2

A composite was produced by compressing 0.2 g of Black Pearls 2000 onto an aluminum foil of area 5×4 cm. This layer of carbon was impregnated with a liquid mixture consisting of 150 part polyethylene glycol (1500) trial, 18.4 parts glycerol, 70 parts propylene carbonate and 58.8 parts hexamethylene dissocyarate. A small amount of Thorcat ® catalyst was added to the mixture to aid curing. The impregnated electrode was covered with a piece of absorbent paper, compressed under a pressure of 26 lbs./sq. in. and allowed to cure for 24 hours. The electrode was then removed from the press and the absorbent paper removed. A further period of 24 hours at 60° C. completes the curing reaction. The resultant electrode has a working area of about 200 m$^2$ with an impedance of about 0.1 Ω when equilibrated in a 10$^{-2}$ millimolar NaCl solution.

EXAMPLE 3

The electrode is prepared as in Example 2, but the liquid mixture consists of 80 parts of 2 sulphoethyl methacrylate lithium salt and 2.0 parts of octaoxyethylene dimethacrylate dissolved in 100 parts of propylene carbonate. The mixture is cured by addition of 2 parts of benzoyl peroxide immediately prior to impregnation into the carbon. This electrode has properties similar to that of Example 2, however the ion concentration is maintained in the polymer even if the aqueous medium has only a very low ion content.

What is claimed is:

1. A high surface are electrode comprising a composite material that comprises
   an electronically conductive particulate filler having a high surface to volume ratio dispersed in
   a binder material, wherein the particles of said particulate filler are substantially in intimate contact, and said binder material conducts ions to and from a substantial proportion of the surface of the filler particles.

2. The high surface area electrode of claim 1 wherein said binder material additionally comprises a polymeric material having ionized groups and counterions.

3. The high surface area electrode of claim 1 adapted to convert an electronic current in an external circuit to an ionic current at the electrode surface, wherein said conductive particulate filler is at some point in electrical contact with an external connection, and wherein the overall electric impedance contributed by the conduction processes is not so high that the electrode assembly as a whole dissipates a substantial amount of energy.

4. The high surface area electrode of claim 1, wherein the conductive filler medium comprises a conductive carbon black having a surface area exceeding 1000 m$^2$/g.

5. The high surface area electrode of claim 1 wherein said conductive particulate filler is a metallic or metal alloy based material.

6. The high surface area electrode of claim 5 wherein said metallic material is selected from the group consisting of copper, nickel, silver, and platinum.

7. A high surface area electrode comprising a composite material that comprises
   an electronically conductive particulate filler having a high surface to volume ratio dispersed in
   a binder material, wherein the particles of said particulate filler are substantially in intimate contact, and said binder material conducts ions to and from a substantially proportion of the surface of the filler particles, wherein said binder is swellable in the solvent to incorporate both solvent and ionic material, said binder retaining sufficient mechanical strength remains to hold the mass of conductive filler particles together.

8. The high surface area electrode of claim 7 wherein said swellable binder material comprises a hydrophilic polymer.

9. The high surface area electrode of claim 7 wherein said swellable binder material comprises a hydrogel.

10. The high surface area electrode of claim 7 wherein said binder material is obtained from cross-linking.

11. The high surface area electrode of claim 10 wherein the material crosslinked are cellulose and its derivatives.

12. The high surface area electrode of claim 11 wherein the material crosslinked are selected from the group consisting of polyethers, polyurethanes, polyacrylates, polyesters, polyimines, and polyphosphasenes.

13. The high surface area electrode of claim 10 wherein the material crosslinked are polymeric materials having a degree of hydrophilic character such that they can absorb water and polar solvents.

14. The high surface area electrode of claim 10 wherein the material crosslinked are siloxanes suitably modified such that they have a degree of hydrophilic nature and can absorb water and polar solvents.

15. The high surface area electrode of claim 10 wherein the material crosslinked is a hydrogel forming polymer systems.

16. The high surface area electrode of claim 7 wherein said solution swellable materials when brought into contact with an ion containing solution will absorb an amount of the solution and its ions and become a conductor of ions.

17. A high surface area electrode comprising a composite material that comprises
    an electronically conductive particulate filler having a high surface to volume ratio dispersed in
    a binder material, wherein the particles of said particulate filler are substantially in intimate contact, and said binder material conducts ions to and from a substantial proportion of the surface of the filler particles, wherein said binder material additionally comprises a polymeric material having ionized groups and counterions, wherein said polymeric material forms polyelectrolytes when neutralized.

18. The high surface area electrode of claim 17 wherein said polymeric material comprises polyacrylic acid.

19. A high surface are electrode comprising a composite material that comprises
    an electronically conductive particulate filler having a high surface to volume ratio dispersed in a binder material, wherein the particles of said particulate filler are substantially in intimate contact, and said binder material conducts ions to and from a substantial proportion of the surface of the filler particles, wherein said binder material additionally comprises a polymeric material having ionized groups and counterions, wherein said polymeric comprises ionizable groups.

20. The high surface area electrode of claim 19 comprising cellulose or its derivatives.

21. The high surface area electrode of claim 19 comprising a polymeric material having a hydrophilic character such that it can absorb water and polar solvents.

22. The high surface area electrode of claim 19 comprising polymeric material selected from the group consisting of polyethers, polyurethanes, polyacrylates, and polyesters.

23. The high surface area electrode of claim 19 comprising polymeric material selected from the group consisting of siloxanes modified such that they have a degree of hydrophilic nature and can absorb water and polar solvents.

24. The high surface area electrode of claim 19 comprising hydrogel forming polymer systems.

25. The high surface area electrode of claim 19 wherein said ionizable group is selected form the group consisting of carboxylic acid groups, sulphonic acid groups, ammonium and alkyl ammonium groups, organo phosphate, organoborate and organocarbonate groups.

26. The high surface area electrode of claim 25 wherein said groups are in their acidic form.

27. The high surface area electrode of claim of claim 26 wherein the acidity is increased by incorporation of a complexing agent.

28. The high surface area electrode of claim 27 wherein said complexing agent is selected from the group consisting of $AsF_3$, $SbF_3$, $BF_3$.

29. The high surface area electrode of claim 25 wherein said groups are in their neutralized form and said material incorporates a counterion.

30. A high surface area electrode comprising a composite material that comprises
an electronically conductive particulate filler having a high surface to volume ratio dispersed in
a binder material, wherein the particles of said particulate filler are substantially in intimate contact, and said binder material conducts ions to and from a substantial proportion of the surface of the filler particles, wherein said material comprises an unreactive, low molecular weight liquid which can diffuse out of the electrode when it is first placed in the medium in which it is to be operated.

31. The high surface area electrode of claim 30 wherein said low molecular weight liquid may be selected from the group consisting of water, an alcohol, an ester, aldehyde, ketone, ether or carbonate.

32. A high surface area electrode comprising a composite material that comprises
an electronically conductive particulate filler having a high surface to volume ratio dispersed in
a binder material, wherein the particles of said particulate filler are substantially in intimate contact, and said binder material conducts ions to and from a substantial proportion of the surface of the filler particles, wherein said binder material comprises a solid polymer electrolyte.

33. A process for the preparation of a high surface area electrode comprising the steps of
preparing a composite comprised of
an electronically conductive particulate filler dispersed in a binder material such that the filler particles are substantially in intimate contact, comprising the further steps of
blending together carbon black with a liquid mixture which contains methoxyoctaoxyethylene methacrylate and octaoxyethylene dimethacrylate;
adding to this blend benzoyl peroxide;
casting the material into a film on a metallic sheet;
curing the material into a rubber material.

34. A process for the preparation of a high surface area electrode comprising the steps of
preparing a composite comprised of
an electronically conductive particulate filler dispersed in a binder material such that the filler particles are substantially in intimate contact comprising the further steps of
compressing carbon black on to a metal foil;
impregnating this layer of carbon with a liquid mixture comprising
polyethylene glycol, glycerol, propylene carbonate and hexamethylene dissocyarate;
comprising and curing.

35. A process for the preparation of a high surface area electrode comprising the steps of
preparing a composite comprised of
an electronically conductive particulate filler dispersed in a binder material such that the filler particles are substantially in intimate contact, comprising the further steps of
compressing carbon black onto a metal foil,
impregnating this layer of carbon with a liquid mixture comprising
sulphoethyl methacrylate lithium salt and octaoxyethylene dimethacrylate dissolved in propylene carbonate.

* * * * *